United States Patent
Normandin

(10) Patent No.: US 7,077,183 B2
(45) Date of Patent: Jul. 18, 2006

(54) POLYETHYLENE FOAM LAMINATING MACHINE AND METHOD

(75) Inventor: Steve Normandin, Acton Vale (CA)

(73) Assignee: Industrial Packaging Group, Lachine (CA)

( * ) Notice: Subject to any disclaimer, the term of this patent is extended or adjusted under 35 U.S.C. 154(b) by 320 days.

(21) Appl. No.: 10/396,823

(22) Filed: Mar. 26, 2003

(65) Prior Publication Data

US 2004/0188015 A1     Sep. 30, 2004

(51) Int. Cl.
*B32B 37/04*     (2006.01)
(52) U.S. Cl. .................. 156/497; 156/359; 156/499; 156/555; 156/582
(58) Field of Classification Search ............ 156/82, 156/358, 359, 497, 499, 555, 580, 582, 583.1, 156/583.5
See application file for complete search history.

(56) References Cited

U.S. PATENT DOCUMENTS 3,959,567 A * 5/1976 Bradley .................. 428/461
4,505,774 A * 3/1985 Ariga et al. ............... 156/499
4,950,352 A * 8/1990 Greller ..................... 156/497
5,476,568 A * 12/1995 Marion et al. ............. 156/359

\* cited by examiner

*Primary Examiner*—James Sells
(74) *Attorney, Agent, or Firm*—Ogilvy Renault LLP; Guy J. Houle

(57) ABSTRACT

A laminating machine and a method for the production of laminated polyethylene foam sheets is described. The machine comprises a conveyor belt having at least two laminating assemblies disposed in spaced-apart relationship therealong. Each laminating assembly has a hot air diffuser for dispensing an elongated ribbon of hot air across the conveyor belt and a press roll which is spaced behind the hot air diffuse. A sheet laminating slot is defined between the diffuse and the press roll. The top surface of a lower polyethylene foam sheet passing under the laminating assembly and the bottom surface of an upper polyethylene foam sheet entering the laminating slot are heated by the hot air ribbon and juxtaposed and pressed by the press roll whereby to fuse the two polyethylene foam sheets together. A plurality of polyethylene foam sheets can be laminated by having a plurality of laminating assemblies along the conveyor.

13 Claims, 6 Drawing Sheets

POLYETHYLENE FOAM LAMINATING MACHINE AND METHOD

TECHNICAL FIELD

The present invention relates to a laminating machine and method for the production of laminated polyethylene foam sheets. Such polyethylene foam sheets are used for making polyethylene foam packaging blocks which are cavitated to protect delicate products such as electronic components for shipping. However, the polyethylene foam sheets may have several other uses and this is but an example of its application.

BACKGROUND ART

Laminated polyethylene foam sheets are desirable for the packaging industry for packaging delicate products as above described. Such sheets are cut, in blocks and cavities are made in the blocks to support delicate products. The polyethylene foam block is then placed in close frictional contact in a shipping carton. This type of packaging is particularly useful for shipping fragile articles in that the article is protected all about in the polyethylene foam block which has the quality of retaining its shape while permitting flexibility in assembly and providing protection to the product. However, a disadvantage with known polyethylene foam laminated sheets is that to laminate the sheets, it is the usual practice to position a bonding sheet between layers of polyethylene foam sheets. The bonding sheet is heated and provides an adhesive between opposed surfaces of polyethylene foam sheets. Known methods and machines for making these are limited in that they cannot make thick laminated sheets from a plurality of these polyethylene foam sheets due to the instability of such lamination. Also, the use of bonding intermediate sheets has not proved adequate in that these bonding sheets sometimes detach from the surfaces of opposed polyethylene sheets, particularly if they are cut in small pieces. The use of bonding plastic sheets also increases the cost of the finished product. This process of manufacture is also slow.

By using bonding plastic sheets between foam sheets it is difficult to line-up the thin bonding plastic sheet in position as it is unstable. This causes machine stoppages and increases the cost of the production. It also makes laminated sheets which are not perfectly bonded together all along their surfaces. With this process only two polyethylene foam sheets are bonded together and the laminated product is thus limited in thickness.

SUMMARY OF INVENTION

It is a feature of the present invention to provide a laminating machine and method for the production of laminated polyethylene foam sheets which substantially overcomes the above-mentioned disadvantages of the prior art.

Another feature of the present invention is to provide a laminating machine and method for the production of laminated polyethylene foam sheets and wherein the sheets are bonded together without the use of intermediate bonding films.

Another feature of the present invention is to provide a laminating machine and method for the production of laminated polyethylene foam sheets which may be formed by a plurality of polyethylene foam sheets bonded together by fusing opposed surfaces thereof and capable of producing thick laminated sheets as required by the packaging industry and wherein the laminated polyethylene foam sheets can be cut in sheet form or block form with deep cavitated areas to support fragile products in package form.

According to the above features, from a broad aspect, the present invention provides a laminating machine for the production of laminated polyethylene foam sheets. The machine comprises a support platform having a driven flat conveying surface having an inlet end and an outlet end. At least two laminating assemblies are spaced-apart over and along the conveying surface. The laminating assemblies each have a hot air diffuser housing provided with an elongated slot opening disposed transversely to the conveying surface. The slot opening has a predetermined width throughout its length. A press roll is spaced behind the slot opening. A sheet laminating slot is formed between the hot air diffuser housing and the press roll. Diffuser adjusting means is provided to adjust the spacing between the slot opening of the diffuser housing and the conveying surface. Press roll adjustment means is provided to adjust the spacing between the press roll and the conveying surface. Hot air feed means supplies hot air under pressure to the diffuser housing. Heating means provides a source of hot air to the hot air feed means.

According to a still further broad aspect of the present invention there is provided a method of producing a laminated polyethylene foam sheet. The method comprises feeding at least two polyethylene foam sheets to be directly laminated together to a laminating assembly of a laminating machine. The laminating assembly comprises a hot air diffuser housing provided with an elongated slot opening disposed transversely above a driven conveying surface of the machine to dispense a ribbon of hot pressurized air. A press roll is spaced behind the slot opening. A sheet laminating slot is defined between the hot air diffuser housing and the press roll. A first of the polyethylene foam sheets is fed on the conveying surface and under the diffuser housing. A second of the polyethylene foam sheets is fed into the laminating slot above the first sheet whereby an underface of the second sheet and a top face of the first sheet are exposed simultaneously to the ribbon of hot pressurized air which melts the polyethylene foam sheet surfaces. Immediately thereafter the sheets are conveyed under the press roll to press the melting surfaces together to bond the sheets.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
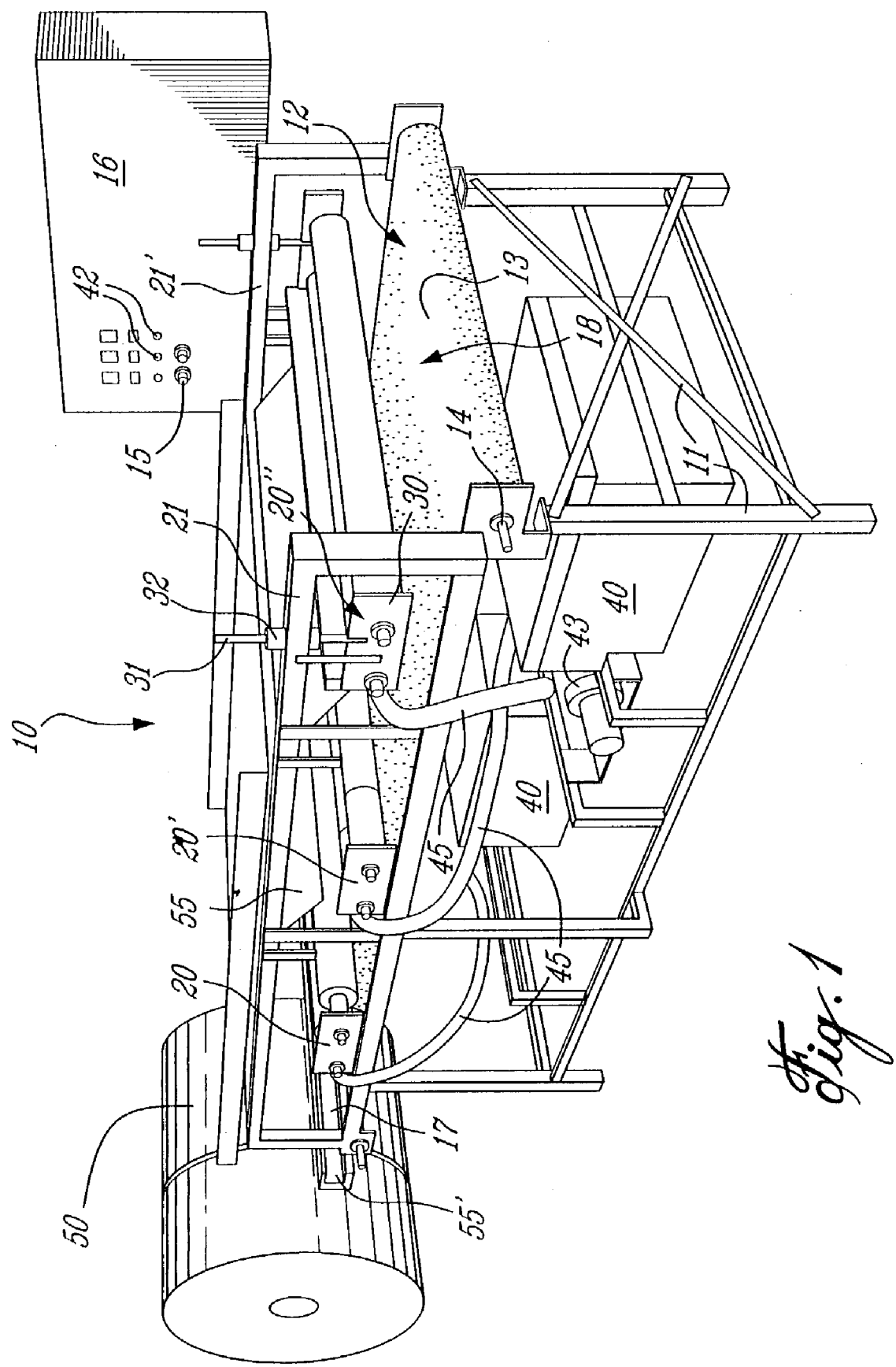
FIG. 1 is a perspective view of a laminating machine for the production of laminated polyethylene foam sheets and constructed in accordance with the present invention.

Referring now to the drawings, and more particularly to FIG. 1, there is shown generally at 10 the laminating machine of the present invention for the production of laminated polyethylene foam sheets. The machine comprises a support frame 11 having a driven flat conveying surface constituted by a conveyor belt 12 having a rough top surface 13 and driven by a drive roll 14 the speed of which is adjustable by a speed control 15 provided on a control panel 16. The conveyor is a flat belt conveyor and defines an inlet end 17 and an outlet end 18.

At least two laminating assemblies 20, herein three being shown, and identified by reference numerals 20, 20' and 20" are secured between frame rails 21 and 21' secured to the support frame 11 and above opposed sides of the conveyor belt 12. Shown more clearly in FIG. 5, the laminating assemblies 20 are each comprised of a hot air diffuser housing 22 provided with an elongated slot opening 23 disposed transversely to the conveyor belt 12. This slot opening has a predetermined width in the range of from about 1/8 to 1/4 inches. The assembly 20 also has a press roll, herein two press rolls 24, are spaced behind the slot opening a predetermined distance. A sheet laminating slot 25 is defined between the slot opening and the first press roll, herein press roll 24'.

Figure 5:
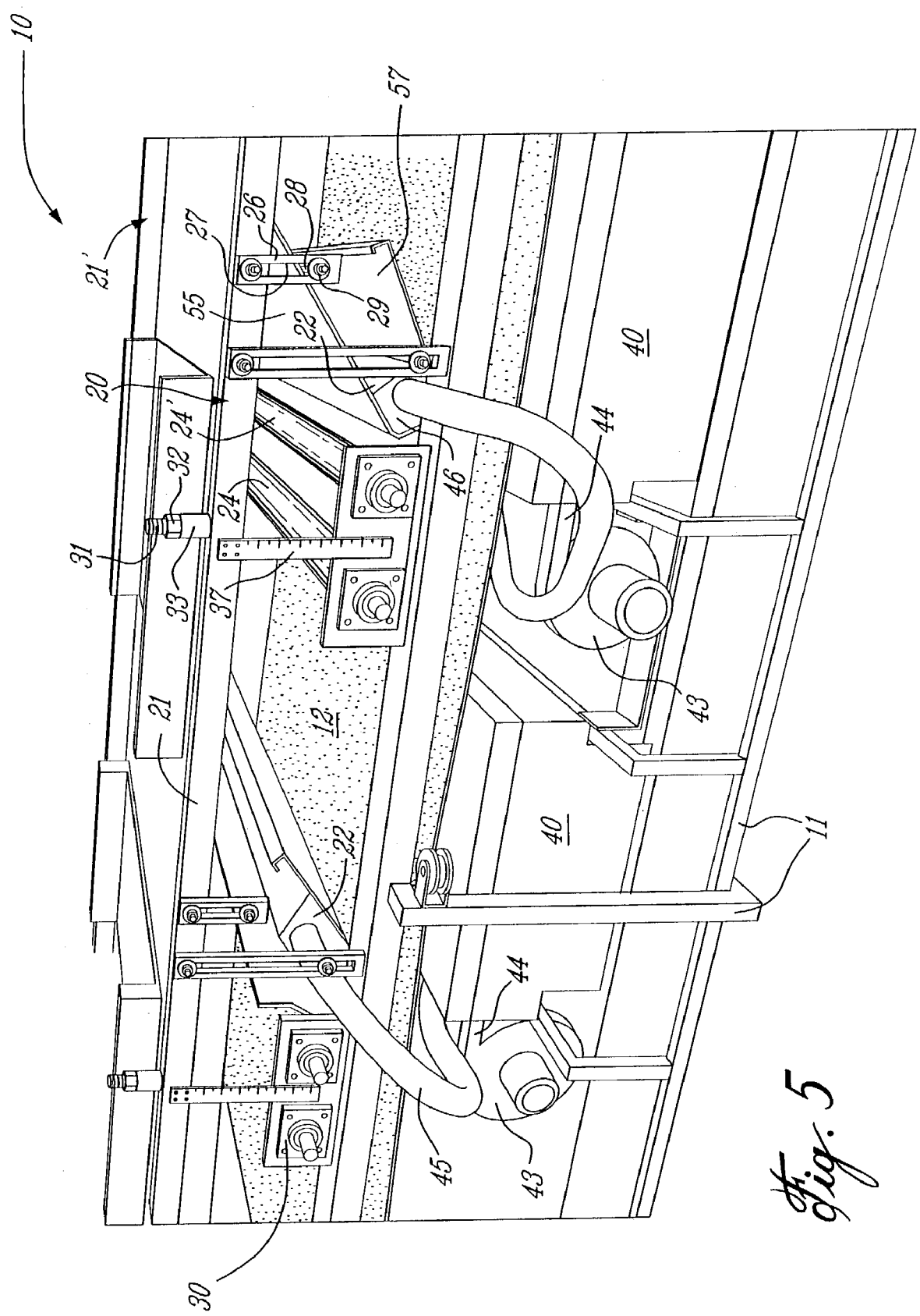
FIG. 5 is an enlarged side view, partly in perspective, illustrating the construction of the laminating assemblies.
Figure 6:
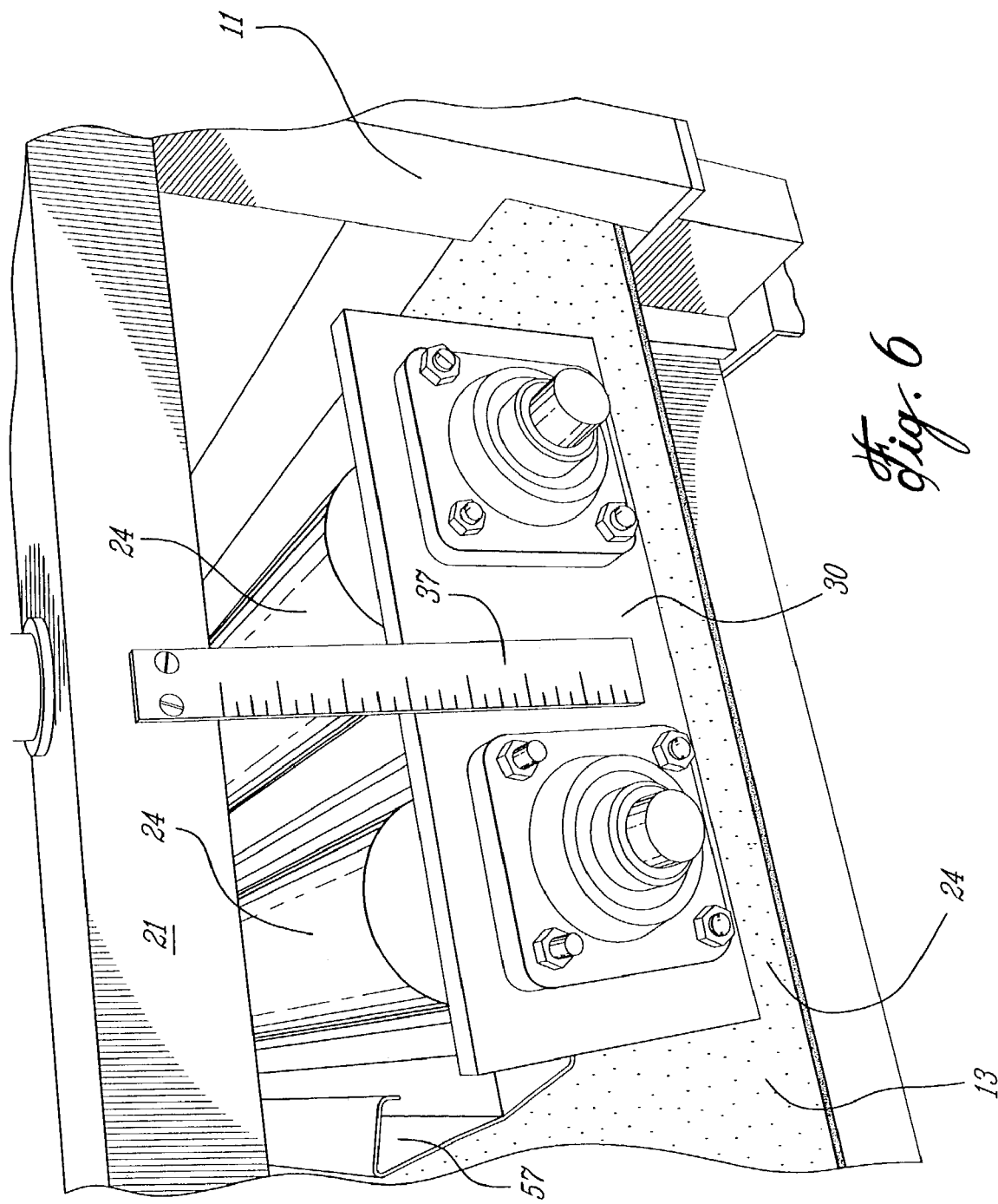
FIG. 6 is an enlarged view showing the adjustment mechanism of the press roll assembly.

As shown in FIG. 5, the diffuser housing 22 is secured to adjustment means in the form of a vertical guide bar 26 having a vertical slot 27 through which securing rods 28, which are connected to the housing 22 project. These securing rods 28 have threaded free ends to receive securing nuts 29 thereto to firmly attach the housing at a desired height relative to the top conveying surface of the conveyor belt 12. The press rolls 24 are secured in side-by-side spaced parallel relationship on a support frame 30 which is secured to a vertical threaded rod 31 which passes through the frame rail 21 and the adjustability is provided by a threaded nut 32 threaded with the free top end of the threaded rod 31 and resting against a hollow bushing 33. A gauge 37 is used to adjust the spacing between the rolls and the surface of the conveyor belt. Of course, a support frame 30 is provided at opposed ends of the pair of press rolls and each is adjustably secured to a respective one of the opposed rails 21 and 21'.

The hot air diffuser housing 22 is a sealed housing and receives hot air under pressure therein from a heating chamber 40 located under respective ones of the laminating assemblies 20.

Figure 4:
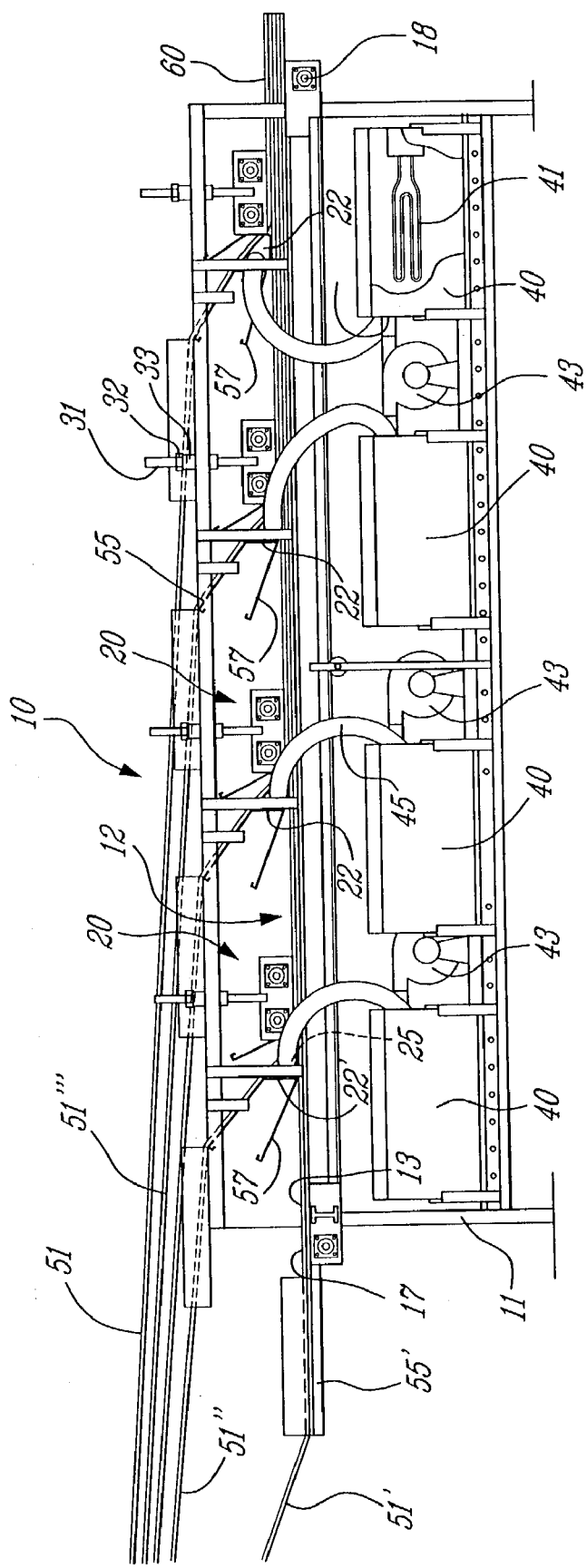
FIG. 4 is a simplified side view showing the basic components of the laminating machine of the present invention and being fed sheets from the polyethylene foam rolls.

As shown in FIG. 4, each heating chamber 40 is provided with a heat supply, herein constituted by resistive heating elements 41 disposed in the heating chamber 40. The resistive elements are secured to a respective voltage regulator 42 provided on the control panel 16 whereby to control the intensity of heat generated in the chambers 40. The regulator can activate selected ones of the resistive elements 41 to control temperature. Accordingly, the heating temperature in individual ones of the heating chambers 40 can be regulated and consequently the heat dispensed through the slot opening 23 of each diffuser can be controlled independently from one another.

As more clearly shown in FIG. 4, each of the heating chambers 40 has a blower 43 connected to an intake end 44 of the chamber 40 for blowing air therethrough. At the other end of the chamber, there is provided an outlet end connected to a supply conduit 45 which is connected to an end wall 46 of an associated air diffuser housing 22 to blow air therein under pressure which can be regulated also by controlling the speed of the blower 43. Accordingly, it is possible to control the temperature of the hot air ribbons emitting from the slot openings 23 of the diffusers 22 at each of the laminating assemblies. Therefore, each of the laminating assemblies 20 also an adjustable temperature control.

Figure 3:
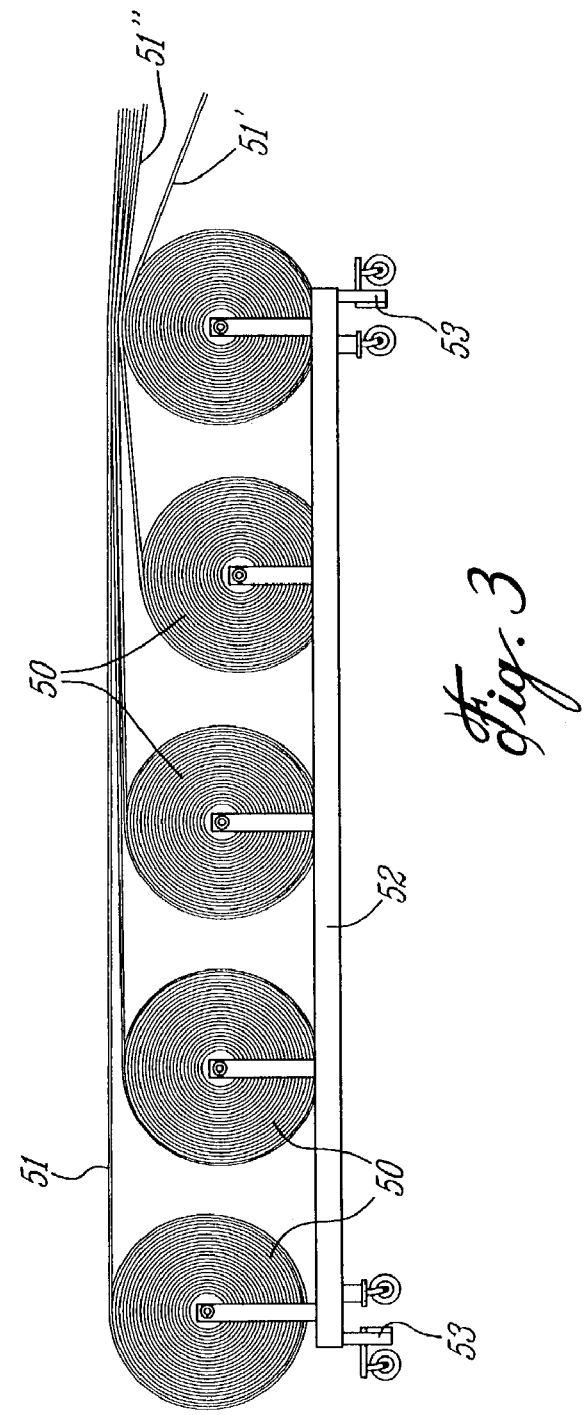
FIG. 3 is a simplified side view showing rolls of polyethylene foam sheets supported on a displaceable frame to feed the laminating machine of the present invention.
Figure 7:
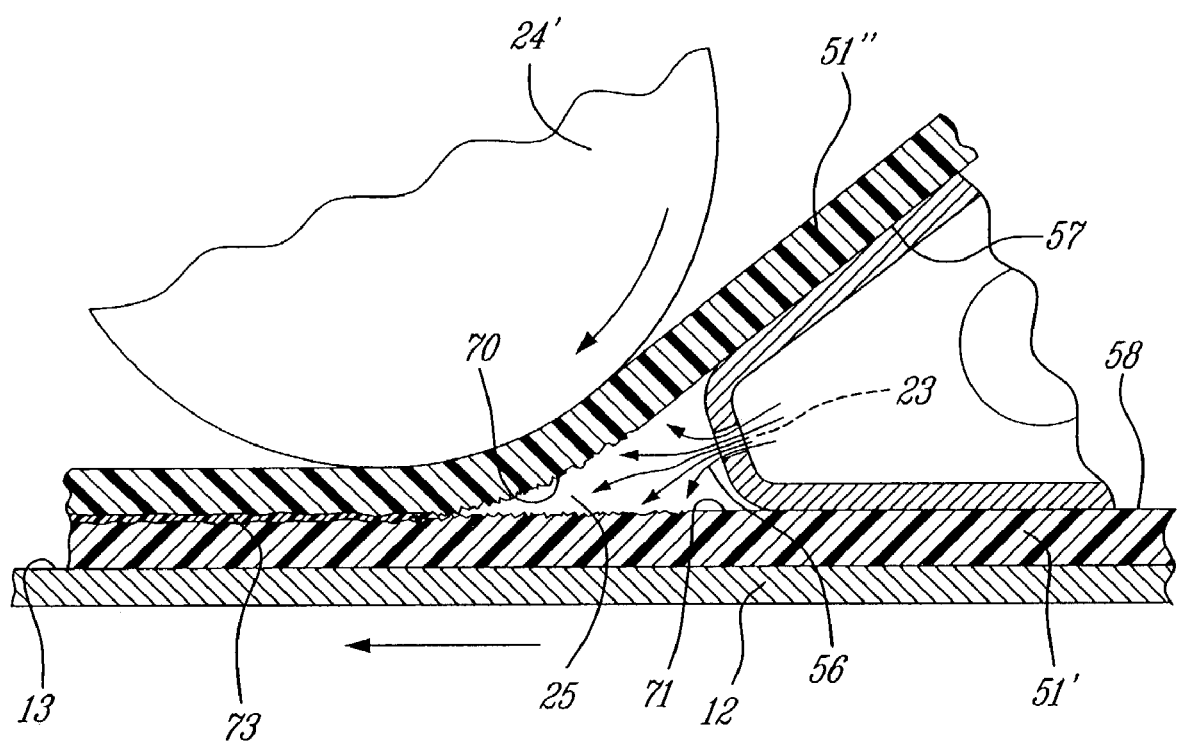
FIG. 7 is an enlarged fragmented view showing the lamination taking place in the sheet laminating slot.

As shown in FIGS. 3 and 4, the laminating machine 10 of the present invention is fed sheets of polyethylene foam which are wound in roll form and as hereinshown there are five rolls 50 of polyethylene foam sheets 51 feeding four laminating assemblies 20. The polyethylene foam rolls 50 are secured to a displaceable support frame 52 provided with brake means 53 whereby the frame 52 can be positioned in line at an input end 17 of the machine whereby to supply polyethylene foam sheets thereto. A first one of the sheets, namely sheet 51' is being fed directly at the top surface 13 of the conveyor belt 12 and under a first laminating assembly 20. A second of these sheets, namely sheet 51" is being fed into the laminating slot 25 of the first laminating assembly 20. A second polyethylene foam sheet 51" is fed into the slot by guide means and such is constituted by an elongated angulated guide plate 55 and top guide plate 55. The guide plates are disposed above the air diffusing housing 22 and the slot opening for supportingly guiding the polyethylene foam sheet 51" into the laminating slot and above a lower polyethylene foam sheet, as shown in FIG. 7. The hot air 56 from the slot opening 23', as shown in FIG. 7, is in close relationship with the underface 57 of the top polyethylene foam sheet 51" and the top surface 58 of the lower polyethylene foam sheet 51' to simultaneously melt the polyethylene foam in the surfaces 70 and 71 before they are being fed under the press rolls, herein the first press roll 24' which applies a predetermined pressure over the laminated sheets to press them together to cause their melted surface to from a bonding layer 73 and thereby laminate the sheets 51' and 51". The adjustment of the roll controls the thickness of the lamination by squeezing the foam sheets together with the molten material inbetween. It has been found by feeding two sheets of 5/8 inch thicknesses and adjusting the rolls to 1 inch that these surfaces will adequately bond together with the thickness of the laminated sheets having been reduced by 1/4 inch. Accordingly, a predetermined pressure is set by the adjustment of the press rolls with respect to the support surface of a conveyor belt and this adjustment is dependent on the thickness of the polyethylene foam sheets being fed to the machine for bonding.

As above pointed out, the temperature of each laminating assembly 20 is independently adjustable. As shown in FIG. 4, there are four laminating assemblies 20. Because the laminated sheet gets thicker as it moves from the input end 17 to the outlet end 18, it is necessary to adjust the height of the laminating assemblies 20 with respect to the top surface 13 of the conveyor belt 12. Also, it is pointed out that because the laminated sheets are heated when passing under the first, second, third and fourth laminating assemblies the temperature of the hot air ribbon also needs to be adjusted and this is done by the temperature regulators. As the two laminated sheets move under the second laminating assembly, the sheets have retained heat and therefore less heat is required to fuse the two laminated sheets with a third laminated sheet, such as sheet 51''' as shown in FIG. 4.

Accordingly, the temperature decreases along the laminating machine. Still further, depending on the thickness of the polyethylene foam sheet, the speed of the conveyor can be adjusted. The temperatures would also be adjusted according to speed. Unlike with prior art machines, the laminating machine of the present invention could laminate several sheets together and there are no intermediate bonding plastic films. This therefore makes the machine of the present invention less problematic than with the prior art machine. Because of the control parameters, the machine may be adjusted to process sheets of different densities and thickness.

Figure 2A:
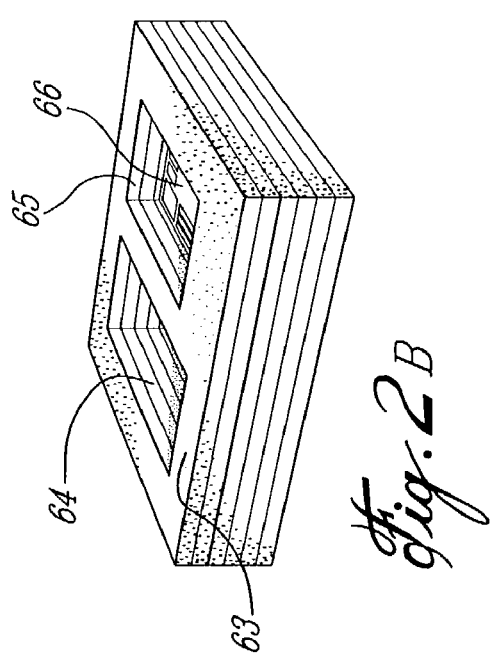
FIG. 2A is a sectional side view of a laminated polyethylene foam sheet formed in accordance with the present invention and wherein a plurality of polyethylene foam sheets are directly bonded together.
Figure 2B:
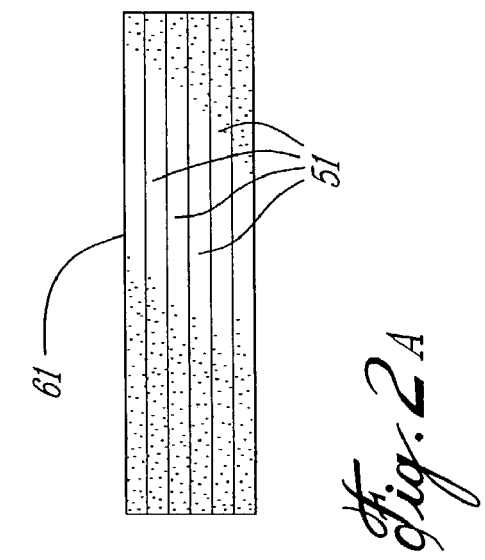
FIG. 2B is perspective view showing a packaging block with a cavitated section formed with the polyethylene foam laminated sheets of the present invention and for packaging delicate components.

As is also shown in FIG. 4, a guide mechanism 57 is positioned at the receiving end of the assemblies 20 to ensure that the laminated sheet is properly guided under the laminating assemblies 20. As hereinshown the laminated sheet 60 exiting the outlet end 18 of the conveyor belt is formed of five polyethylene foam sheets bonded together throughout their opposed surfaces. This laminated sheet 60 is discharged and may be fed to a cutting machine where it is cut in sheet or block form. Such a block form is shown in FIG. 2A and identified by reference numeral 61. Such blocks may be used as packaging blocks, such as blocks 62 illustrated in FIG. 2B which are cavitated in a surface 63 thereof, herein two cavities 64 and 65 being shown, with cavity 65 containing a delicate product therein such as an electronic circuit board 66. Such foam blocks with their products secured therein are then positioned in close fit within a packaging box (not shown) for shipping. Accordingly, it can be seen that the electronic component 66 is well protected all about and spaced from side walls and opposed top and bottom walls and because this polyethylene foam is deformable, it is easy to insert the component 66 in the retaining cavities 64 and 65 and to deform the block to insert in close sliding fit within an outer container (not shown).

Briefly summarizing the method of operation of the machine of the present invention, it comprises feeding at least two polyethylene foam sheets to be directly laminated together to a laminating assembly of a laminating machine. The laminating assembly comprises a hot air diffuser housing provided with an elongated slot opening disposed transversely above a driven conveying surface of the machine. A ribbon of hot pressurized air is dispensed from the slot opening. A press roll is spaced behind the slot opening. A sheet laminating slot is defined between the hot air diffuser housing and the press roll. A first of the polyethylene foam sheets is fed on the conveying surface and under the diffuser housing. A second polyethylene foam sheet is fed into the laminating slot above the first sheet whereby to expose an underface of the second sheet and a top face of the first sheet simultaneously to the slot opening and the ribbon of hot pressurized air for melting the polyethylene foam sheet surfaces. Immediately thereafter the sheets are conveyed under the press roll to press the melting surfaces together to bond the sheets.

The temperature of the air in the air diffusing housings 22 is adjustable as well as the speed of the conveyor. Also, the press rolls and the hot air diffusing housings are adjustable with respect to the top surface of the conveyor to adjust for the changing thickness of the laminated sheets. The temperature is also controlled at each of the assemblies along the laminating machine. With the present invention it is also possible to laminate sheets of different thicknesses. A typical example of the laminating machine of the present invention is to laminate polyethylene foam sheets of 5/8 inches in thickness and 51 inches in width. The process of the present invention reduces the thickness of the sheets to about 1/2 inch to produce a lamination of 1 inch. The machine can have several laminating assemblies to produce very thick laminated polyethylene foam sheets. A typical example of the temperature of a three section machine may consist of the first section having a temperature of 37520 F., the second 360° F. and the third stage 345° F.

It is within the ambit of the present invention to cover any obvious modifications of the preferred embodiment described herein, provided such modifications fall within the scope of the appended claims.

What is claimed is:

1. A laminating machine for the production of laminated polyethylene sheets, said machine comprising a support platform formed by a driven belt conveyor having a flat conveying surface, said bell conveyor defining an input end and an output end, at least two laminating assemblies spaced apart over and along said conveying surface; said laminating assemblies each having a hot air diffuser housing provided with an elongated slot opening disposed transversely to and spaced above said conveying surface, said slot opening having a predetermined width throughout its length, and a press roll spaced behind said slot opening; a sheet laminating slot formed between said hot air diffuser housing slot opening and said press roll, diffuser adjustment means to adjust the spacing between said slot opening of said diffuser housing and said conveying surface, press roll adjustment means to adjust the spacing between said press roll and said conveying surface, hot air feed means to supply hot air under pressure to said diffuser housing, and heating means to provide a source of hot air to said hot air feed means, guide means disposed above said elongated slot opening supportingly guiding a top polyethylene sheet into said laminating slot above a lower polyethylene sheet whereby to expose an underface of said top polyethylene sheet to said slot opening of said hot air diffuser to simultaneously melt said underface of said top polyethylene sheet and a top face of said lower polyethylene sheet for heat fusing said polyethylene sheet surfaces together, said top and lower polyethylene sheets being guided under said press roll immediately downstream of said sheet laminating slot to apply a predetermined pressure between said upper and lower polyethylene sheets as they are melting to set the thickness of said laminated sheets at said laminating assembly.

2. A laminating machine as claimed in claim 1 wherein said predetermined pressure is set by said press roll adjustment means which is comprised by adjustable roll supports secured to opposed ends of said press roll, said predetermined distance being dependent on the thickness of said polyethylene sheets and the temperature of said hot air under pressure released from said elongated slot opening.

3. A laminating machine as claimed in claim 2 wherein there are two of said press rolls secured to a support frame in side-by-side spaced parallel relationship, said support frame being secured to said adjustable roll supports.

4. A laminating machine as claimed in claim 1 wherein there is a plurality of said laminating assemblies spaced-apart along said conveying surface.

5. A laminating machine as claimed in claim 4 wherein said belt conveyor has an adjustable speed drive, said belt conveyor having a rough top conveying surface for frictional engagement with a lowermost one of said polyethylene sheets being laminated together.

6. A laminating machine as claimed in claim 1 wherein said diffuser adjustment means is constituted by an adjustable support arm secured at opposed ends of said diffuser housing, and frame rails secured to said support platform above said conveying surface and along opposed sides thereof.

7. A laminating machine as claimed in claim 1 wherein said hot air feed means is a blower secured to a heating chamber having a heat supply, said blower convecting air through said heating chamber and into said diffuser housing and out through said slot opening.

8. A laminating machine as claimed in claim 7 wherein said heat supply is constituted by resistive heating elements disposed in said heating chamber, and a regulator to control said resistive heating elements and the temperature of said hot air exiting said slot opening of said diffuser.

9. A laminating machine as claimed in claim 1 wherein there is further provided polyethylene roll support means for supporting two or more of said rolls side-by-side and in line at said inlet end of said conveying surface to supply polyethylene sheets thereto, a first of said sheets being fed on said conveying surface and under said diffuser housing of a first of said laminating assemblies, a second of said sheet being fed into said laminating slot of said first of said laminating assemblies.

10. A laminating machine as claimed in claim 9 wherein there are a plurality of said laminating assemblies spaced-apart along said conveying surface.

11. A laminating machine as claimed in claim 10 wherein the temperature of said first of said laminating assemblies is higher than the temperature of subsequent ones of said plurality of laminating assemblies, said temperature being reduced at each said subsequent ones of said plurality of laminating assemblies.

12. A laminating machine as claimed in claim 1 wherein said predetermined slot opening is in the range of from about ⅛ to ¼ inches.

13. A laminating machine as claimed in claim 1 wherein said heating means is an adjustable heating means.

* * * * *